(12) United States Patent
Ferraro et al.

(10) Patent No.: US 7,991,707 B2
(45) Date of Patent: Aug. 2, 2011

(54) SYSTEMS AND METHODS FOR THE PROVISION OF POSTAGE

(75) Inventors: Mark Ferraro, Hamden, CT (US); Richard Rosen, Trumbull, CT (US)

(73) Assignee: Neopost Technologies, Bagneux (FR)

( * ) Notice: Subject to any disclaimer, the term of this patent is extended or adjusted under 35 U.S.C. 154(b) by 530 days.

(21) Appl. No.: 11/877,086

(22) Filed: Oct. 23, 2007

(65) Prior Publication Data

US 2009/0106146 A1    Apr. 23, 2009

(51) Int. Cl.
*G06F 17/00* (2006.01)
(52) U.S. Cl. ........................................ 705/401
(58) Field of Classification Search ........................ None
See application file for complete search history.

(56) References Cited

U.S. PATENT DOCUMENTS

| | | | |
|---|---|---|---|
| 5,917,925 A | 6/1999 | Moore | |
| 6,427,139 B1 | 7/2002 | Pierce | |
| 7,120,610 B1 * | 10/2006 | Brookner et al. | 705/401 |
| 7,356,517 B2 * | 4/2008 | Barrows | 705/401 |
| 2003/0037007 A1 * | 2/2003 | Beckstrom et al. | 705/60 |
| 2003/0101143 A1 * | 5/2003 | Montgomery et al. | 705/62 |
| 2005/0065897 A1 * | 3/2005 | Ryan et al. | 705/401 |

FOREIGN PATENT DOCUMENTS

WO    WO 2006/138237    12/2006

OTHER PUBLICATIONS

"Nifty mail center software", Pavely, Richard, Office Solutions, v17n10, Oct. 2000.*
European Search Report corresponding to the European EP 08167374 application dated Jan. 30, 2009.
XP-002138350 "Information-based indicia program (IBIP) performance criteria for information-based indicia and security architecture for closed IBI postage metering systems" information based indicia program host system specification, Jan. 1999.

* cited by examiner

*Primary Examiner* — Rutao Wu
(74) *Attorney, Agent, or Firm* — Morris & Kamlay LLP (57) ABSTRACT

Systems and methods for providing postal services which allow customers to flexibly obtain postal services while also allowing customers to defer the payment of postage until the time of mailing or later. Information provided by a postal service is used to identify items that have been processed by the postal service, allowing a service provider to collect payment for those items after they have been provided to the postal service for processing.

19 Claims, 4 Drawing Sheets

SYSTEMS AND METHODS FOR THE PROVISION OF POSTAGE

BACKGROUND OF THE INVENTION

1. Field of the Invention

The present invention generally relates to the provision of postal services. More specifically, the present invention provides for the flexible provisioning of postal services, while also allowing customers to pay for postal services at the time of actual mailing or later.

2. Background Art

Medium to high volume customers of the United States Postal Service (USPS) typically use either Permit Mail or Metered Mail services. Both services allow customers to prepare items to be mailed without affixing traditional postage in the form of stamps.

Permit Mail customers are assigned a permit and customer account from the USPS. The permit allows customers to print items to be mailed with a Permit Imprint Indicia. The Permit Imprint Indicia is a marking of relatively low complexity and may be printed in bulk on each piece of mail ahead of mailing. Customers may then deliver the marked items to the USPS, which may subsequently deduct postage from the customer account for each piece of mail at the time of mailing (i.e., processing by the USPS).

Metered Mail customers are provided with a meter, generally a Postal Security Device (PSD) by a service provider. Customers may purchase postage, which may then be loaded in the PSD. Once loaded with pre-paid postage, the PSD may be used to print indicia on items to be mailed indicating that postage has been paid. When the quantity of postage remaining in the PSD runs low, customers may purchase additional postage from a service provider, after which the service provider may load the PSD with the additional postage.

Traditional Metered Mail and Permit Mail services each have a number of limitations. For example, Permit Mail may require all items of a batch mailing to be of the same weight or be associated with a manifest identifying each item. In addition, mailings using Permit Mail are processed in bulk by the USPS. Bulk processing can lead to processing errors as the USPS does not individually inspect each item mailed. Such processing errors may result, for example, in an incorrect value of postage being charged. Bulk processing can also increase the likelihood of fraud being committed against the USPS.

While Metered Mailing services may alleviate some of the shortcomings of Permit Mail, traditional Metered Mail services also have significant disadvantages. Most notably, traditional Metered Mailing services require customers to pay for postage at the time the meter is loaded with postage, rather than at the time of actual mailing. Therefore, customers may need to make a large payment or deposit well before a mailing is ready for delivery to the USPS.

Therefore, there exists a need for a postage provisioning service which allows customers to flexibly prepare mailings, of different sizes and weights, but that does not require customers to purchase postage in advance of actual mailing.

BRIEF DESCRIPTION OF THE DRAWINGS

The accompanying drawings illustrate the present invention and, together with the description, further serve to explain the principles of the invention and to enable one skilled in the pertinent art to make and use the invention.

DETAILED DESCRIPTION OF THE INVENTION

Embodiments of the present invention provide systems and methods for the provision of postage by using postage credits or by postage use tracking. Embodiments allow for the flexible provisioning of postage using postage meters such as PSDs. The meters may be provided to customers and may allow customers to process mailings in the same manner as traditional postage meters. Embodiments may also allow customers to defer actual payment for postage until the time of mailing or later.

Embodiments of the present invention allow a service provider or customer to load a PSD with postage credits instead of actual postage or an actual monetary value representing an amount of postage available. By loading the PSD with postage credits instead of actual postage, the customer need not pay for postage prior to processing any mail pieces. The amount of postage credits loaded into a PSD can be tracked by a descending register value of the PSD which may represent the amount of postage credits or balance remaining in the PSD. As mail is processed by the PSD, the descending register value can be incrementally decreased by the postage required by each piece of processed mail. The descending register value and a unique PSD identifier can be encoded in an indicium on each piece of processed mail. This indicium can be scanned and captured by a postal carrier when the mail item is processed for delivery. The data contained in the indicium for each piece of mail can then be shared with the service provider. The service provider can then determine the amount of postage credits used by the customer for each mail piece processed by a particular PSD. Using this information, the service provider may then bill the customer for the actual amount of postage used well after the mail piece was metered for postage and processed by the carrier for delivery.

Embodiments of the present invention also allow a customer to meter mail without having postage credits loaded into a PSD by having a service provider track an ascending register value of a PSD. The ascending register value of the PSD can be incremented by the amount of postage required by each piece of mail processed by the customer using a specific, uniquely identified PSD. Each piece of processed mail can include an indicium containing the PSD identifier and the current ascending register value of the PSD. This indicium can be scanned and captured by a postal carrier when the mail item is processed for delivery. The data contained in the indicium for each piece of mail can then be shared with the service provider. The service provider can then determine the amount of postage used by the customer for each mail piece processed by a particular PSD (e.g., by using piece count information and ascending register information). Using this information, the service provider may then bill the customer for the actual amount of postage used well after the mail piece was metered for postage and processed by the carrier for delivery.

In the interests of clarity the description below discusses various aspects of the present invention within the context of the United States Postal Service. It is to be understood that the present invention is not limited to applications involving the USPS. Rather, it may apply to any delivery system, including private carriers and alternative postal systems (e.g., foreign postal carriers). Similarly, the example embodiments refer to USPS specific technologies, such as the PSDs and the Mail Stream. Again, these technologies are referred to for clarity in explanation and are not intended to limit the scope of the present invention.

System Overview

Figure 1:
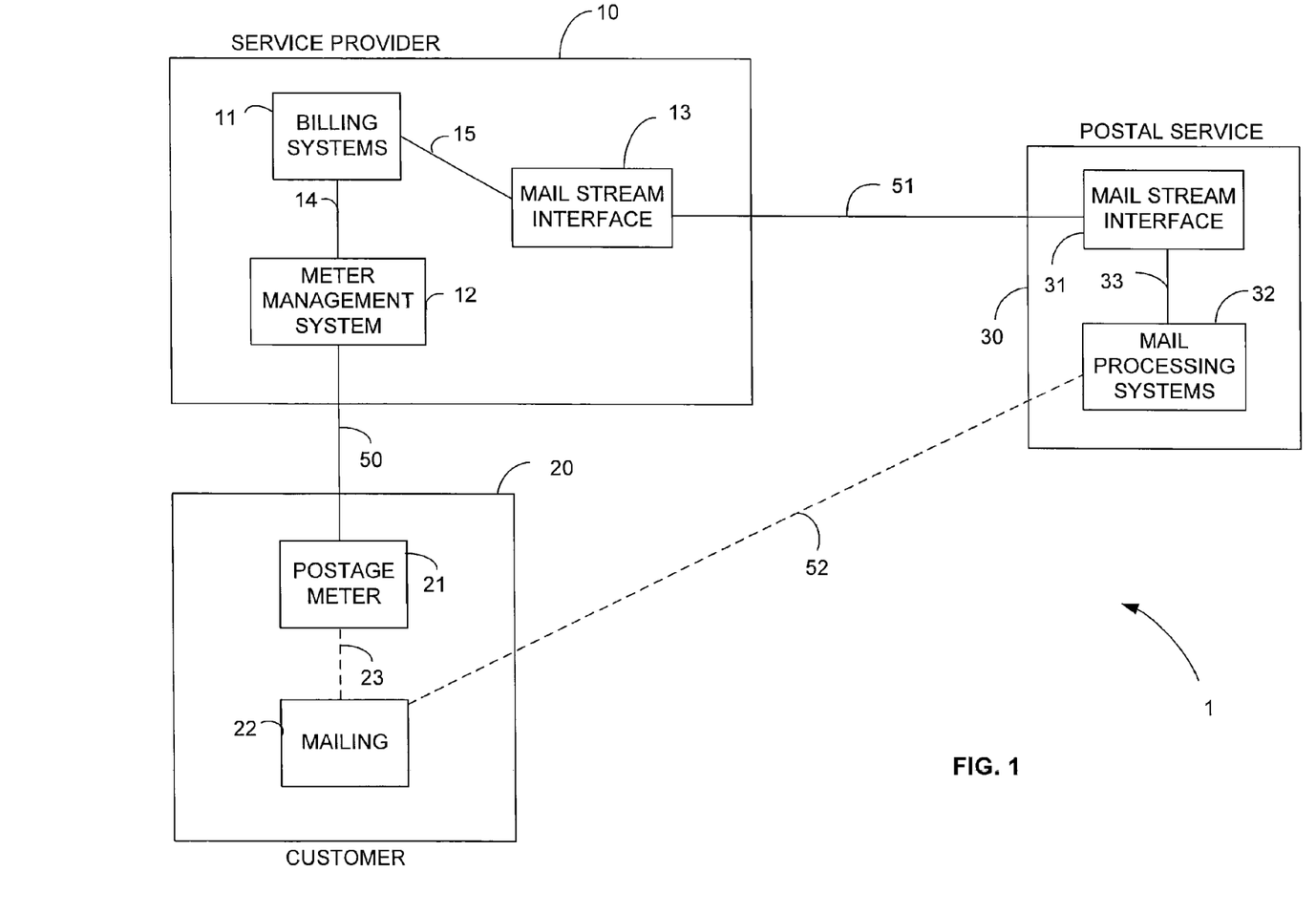
FIG. 1 depicts an example system for providing postal services, in accordance with an aspect of the invention.

FIG. 1 illustrates a postage provisioning system 1 in accordance with an aspect of the present invention. The postage provisioning system 1 may include a postage meter 21. The postage meter 21 may be provided to a customer 20 by a service provider 10. The postage meter 21 may be located at a customer location. The postage meter 21 may be a PSD, or any other suitable device. More than one postage meter 21 may be supplied to a customer 20. The meters 21 may be housed in the same or separate locations and may provide the same or different features.

The postage meter 21 may be serviced by a service provider 10. The service provider may maintain a meter management system 12 to facilitate the provision of postage meter services. The postage meter management system 12 may be connected to postage meters 21. The connection 50 may be provided in any means suitable, such as over telephone services, private data networks, the Internet, etc. The connection 50 may also be secured through encryption and authentication techniques.

The service provider 10 may also maintain a billing system 11. The billing system 11 may be capable of recording, storing, and processing customer account information. It may also be capable of interfacing with the meter management system 12, in order to facilitate the provisioning of postage credits to meters 21 and/or the charging of customer accounts for postage and services.

In addition the service provider 10 may also maintain a Mail Stream interface 13. The Mail Stream interface 13 may be in communication with the other service provider systems. Such connectivity may be provided by suitable network connectivity 14 and 15. It is also possible that any of the service provider systems 11, 12, and 13 may not be separate and distinct systems but may be integrated together into one or more systems. The Mail Stream interface 13 may also be in communication with a postal carrier 30 (e.g., the United States Postal Service) through a suitable connection or network 51. The Mail Stream interface 13 may be capable of interfacing with USPS systems and of receiving data from the USPS 30. The Mail Stream interface 13 may also be capable of processing data received from the USPS 30.

The customer 20 may be able to use the postage meter 21 to prepare mailings 22. This preparation may be accomplished in any suitable fashion. Typically the meter 21 is used to process 23 individual pieces of mail. Once the mailing 22 is processed 23 it may be delivered 52 to the USPS 30.

The USPS 30 may maintain a number of mail processing systems 32. These systems 32 may be used to process a mailing through all stages of delivery. The systems 32 may include bar code scanners, databases, user terminals and all of the other system the USPS 30 employs to deliver mail.

The mail processing systems 32 may be in communication 33 with a Mail Stream interface 31, using any suitable form of communication. The Mail Stream interface 31 may be capable of making selected information from the mail processing systems 32 available to service providers 10. To this end the Mail Stream interface 31 may be in communication with a mail stream interface 13 at a service provider location. Again the communication may be facilitated through any suitable communications facility 51.

Provision of Postal Services

Figure 2:
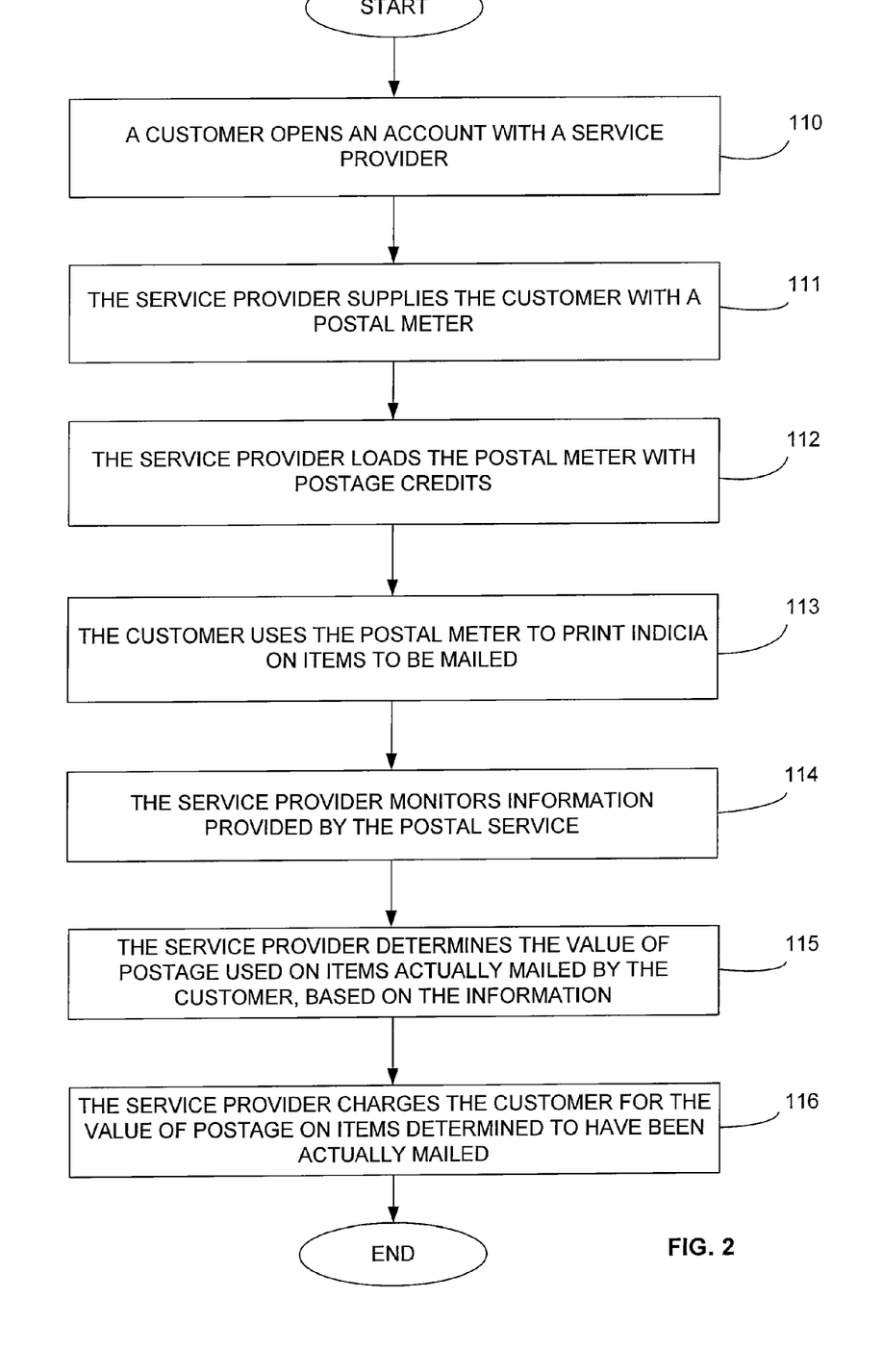
FIG. 2 depicts an example method for providing postal services, in accordance with an aspect of the invention.

FIG. 2 illustrates a method, in accordance with an aspect of the present invention, which may be used to provide mailing services in a flexible manner, while allowing customers to pay for services at the time of mailing or later. As illustrated in FIG. 2, a service provider may allow postal customers to open accounts for the provision of postal services 110. The method in FIG. 2 may be implemented using portions of the system illustrated in FIG. 1. For example, the service provider may lease or otherwise provide to customers PSDs 111 and may load the PSDs with postage credits prior to charging the customers for the postage 112.

Once supplied with postage credits, the PSDs may be used to meter items of mail. Customers may use the PSDs to apply postage or an indication of postage to items prior to mailing by causing the PSDs to print indicia on the items 113. Customers may then deliver the items to be mailed to the USPS for normal processing. Once delivered, the USPS may process the mailed items.

During the course of processing, the USPS may capture information about each piece of mail into mail processing systems and may make that information, or a subset of that information, available to third-party service providers. For example, the USPS may scan machine readable bar codes or other indicia printed on items of mail during processing, such as those printed by PSDs. The information represented in those bar codes or indicia may be entered into the USPS's computer systems and may then be made available to third-parties such as service providers.

The service provider may monitor the information made available by the USPS 114. Using the information, the service provider may determine the value of postage actually used by a customer 115. That is the service provider may determine the amount of mail that has been processed by the USPS, based on the information provided by the USPS, and may determine the quantity of postage used by the identified mail. The service provider may then bill the customer appropriately 116.

Determining Postage Used

Figure 3:
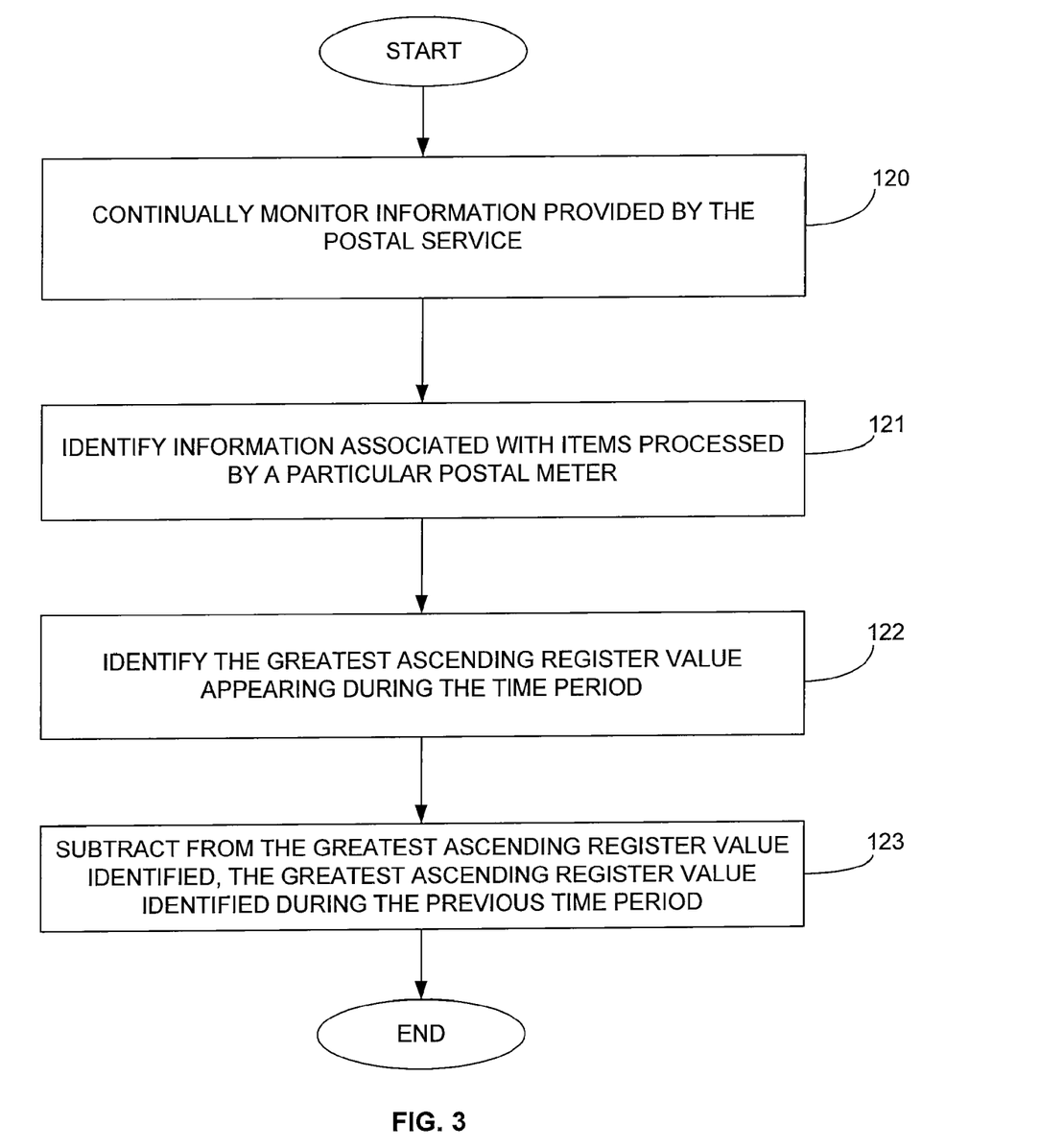
FIG. 3 depicts an example method for determining the value of postage used on items actually mailed, in accordance with an aspect of the invention.

FIG. 3 depicts method by which a service provider may determine the amount of postage used by a customer, in accordance with an aspect of the present invention. The method illustrated in FIG. 3 may be implemented using portions of the system illustrated in FIG. 1. For example, the service provider may continually monitor the information provided by the USPS 120. Once an item of mail is scanned or otherwise processed by the USPS, a record of the processing is made in the USPS's computer system. The data collected is termed the Mail Stream and is made available by the USPS to some third parties. Specifically, the Mail Stream may be made available to the provider of the current service.

Among other information appearing in the Mail Stream is the information printed on each item of mail by the PSDs. PSDs print indicia on the items that it processes. The format of these indicia is typically standardized. Included in the indicia can be a machine readable bar code containing several pieces of information, including, e.g., a serial number identifying the PSD which generated the indicium, a mail piece count value, the present value of an ascending register, and/or the present value of a descending register. The ascending register is a value stored in each PSD which represents the total amount of postage metered by the PSD using, for example, postage credits over its lifetime. The ascending register begins at zero and is incremented by the value of postage associated with each piece of mail processed—i.e., the amount of postage credits used for each piece of mail. The ascending register is never reset. The descending register is also a value stored in the PSD and represents the total amount of postage credits currently loaded in the PSD. The descending register is set when the PSD is loaded with postage credits and is decremented as each piece of mail is processed until no postage credits remain. The descending register may be increased again when the PSD is refilled with additional postage credits. The mail piece count value can sequentially identify each mail piece processed by a particular PSD.

In an example embodiment, the service provider could monitor the Mail Stream, utilizing the information found in the Mail Stream to determine the value of postage on mail actually delivered to the USPS by a customer. For example, the service provider could monitor the Mail Stream continuously for a period of time 120. The period of time might be a predetermined increment such as a day, or week, etc., or the time period could be open ended.

During the period of monitoring, information associated with items appearing in the Mail Stream could be examined. It may be possible to examine many different types of information from the Mail Stream data, including, for example, the ascending register value printed on each piece of mail, the descending register value, the mail piece count value, the identification number of the PSD that processed each piece of mail, various times associated with the processing of each piece of mail, and/or the customer number printed on the mail. Using, for example, the PSD Serial Number the service provider might determine which pieces of mail appearing in the Mail Stream are associated with a particular PSD or customer 121. The service provider might then determine the value of postage on mail sent by the customer during the period of monitoring.

For instance, in an example embodiment the service provider might use the ascending register field to determine the quantity of mail sent, measured in postage credits expended. During the time interval, the service provider may examine information relating to all items of mail associated with the customer or customer's PSD 121. The service provider may then determine from that examination the greatest value of the ascending register appearing on an item associated with the customer 122.

At the end of the time period, the service provider may subtract from the greatest ascending register value the greatest value of the ascending register appearing during the time period immediately preceding the current time period 123. The service provider may then consider the difference between the two values to be the value of postage on mail actually processed by the USPS. The service provider may then store the greatest ascending register value for future use, for example at the end of the next time period.

In an example embodiment, information other than the ascending register may be used to determine the amount of postage on mail processed by the USPS. For example, a service provider may examine the Mail Stream for the descending register value, possibly in connection with other information such as the date of mailing. In order to identify the quantity of postage on mail delivered to the USPS, a service provider may compare the lowest descending register value to the last known descending register value. Though, since the descending register is increased when a PSD is reloaded with postage credits, the service provider will need to account for any increases in descending register values. Multiple methods of accounting for PSD reloading are possible. For example, the accounting may be accomplished by comparing time records found in the information with the time the PSD was last reloaded with postage. Using such a method, a service provider might provide a customer with a PSD. The customer may process the mail using the PSD and may deliver that mail to the USPS. The USPS may process and deliver the pieces of mail. Once delivered the service provider may search the Mail Stream for the smallest value of the descending register appearing in the information. However, since it is possible the PSD used was reloaded the service provider may also examine the Mail Stream for the time that each piece of mail was processed by the PSD. Since the service provider will know the time at which the PSD was refilled with postage credits, the service provider may account for the change in descending register.

For example, if the service provider knows that the PSD was refilled at 1:00, it may search the Mail Stream for the smallest value of the descending register value occurring on mail processed before 1:00 and it may also examine the information for the smallest value occurring after 1:00. Therefore, the service provider may obtain two smallest descending register values. One representing the smallest value obtained since the last time the Mail Stream was evaluated, and one representing the smallest value since the PSD was reloaded. By calculating the difference between the first value and the previously recorded least descending register value and adding that to the difference between the second value and the value of the reloaded descending register value, the service provided may again determine the quantity of postage credits actually used. The technique may be expanded to account for multiple reloads in a similar manner.

Should a customer use a PSD to apply postage and subsequently destroy or otherwise not mail the items imprinted, the service provider may correct for the unsent items. In an example embodiment, the customer may notify the service provider that postage had been printed but the items have not been sent. The service provider may require information about the items not sent. For example, the service provider may require the number of items not mailed, the postage printed on those items, and may possibly require proof that the items have been destroyed. The service provider may then take any action needed to correct for the unsent items. The service provider may, for instance, not charge the customer for the unsent mail. Where the service provider uses the greatest ascending register value to determine postage credits used, as explained above, the service provider may correct its calculation of total postage credits used by subtracting the unused postage credits from the difference between the current and previous ascending register values. The service provider may also load the PSD with replacement postage credits for that "expended" on the unsent mail.

Before taking such action, the service provider may also require information identifying the unsent mail. For instance, the service provider may require the ascending register values printed on each piece of mail that will not be sent, though any other identifying information is suitable also. In this way, the service provider may monitor the Mail Stream to ensure that the mail is not actually sent, either accidentally or in an attempted fraud. Should the service provider identify the mail in the mail stream it may take corrective action, such as billing the customer for the mail pieces or notifying service provider personnel that the canceled mail items have been identified.

In another example embodiment, a service provider may automatically account for unused postage credits. For example, a service provider may periodically examine the Mail Stream for not only the highest ascending register value appearing during the period but for all ascending register values appearing during the period. In addition, the service provider may examine the Mail Stream for the postage associated with each piece of mail appearing in the Mail Stream. Using the postage and the ascending register information the service provider may identify the quantity of postage printed on mail which has not yet appeared in the Mail Stream. Once each postage and ascending register value appearing in the Mail Stream has been identified, the service provider may identify mail unsent by subtracting from each ascending register value the postage credit value associated with that ascending register value. Since the difference is the previous ascending register value that would have been printed, if all mail processed by the PSD had been sent, the difference should appear in the Mail Stream as the next highest ascending register value. If a gap appears then the amount of non-appearing, postage may be determined and corrected for.

For example, a customer may print four pieces of mail each requiring 50 cents in postage. The ascending register value may initially begin at a running total postage credit value of $5.00. Thus the first piece of mail will be printed with 50 cents of postage and an ascending register value indicating $5.50 of postage credits. Similarly the second through fourth pieces may be printed with ascending register values of $6.00, $6.50, and $7.00 respectively. When the service provider examines the Mail Stream it may find the first, third, and fourth pieces of mail. It may then subtract from the highest ascending register value seen, $7.00 on the fourth piece of mail, the postage associated with the fourth piece of mail. $7.00−50¢ is $6.50, the value of the next highest ascending register value seen. However, when the service provider subtracts 50¢ from $6.50, processing the third piece of mail, it will find the difference to be $6.00. Since the second piece of mail did not appear in the Mail Stream, an ascending register value of $6.00 also does not appear in the Mail Stream. Therefore, the service provider may determine that the second piece of mail was not sent and may account for it appropriately. For instance, the service provider might not charge the customer for the postage amount associated with the missing mail, which is readily determined as the difference between the expected, but not appearing, ascending register value and the next greatest ascending register value actually appearing, which is less than the missing ascending register value.

The above described methods can be expanded for situations in which credits are not loaded into the PSD but instead a service provider tracks the ascending register value of a particular PSD over time.

Charging for Postage Used

Figure 4:
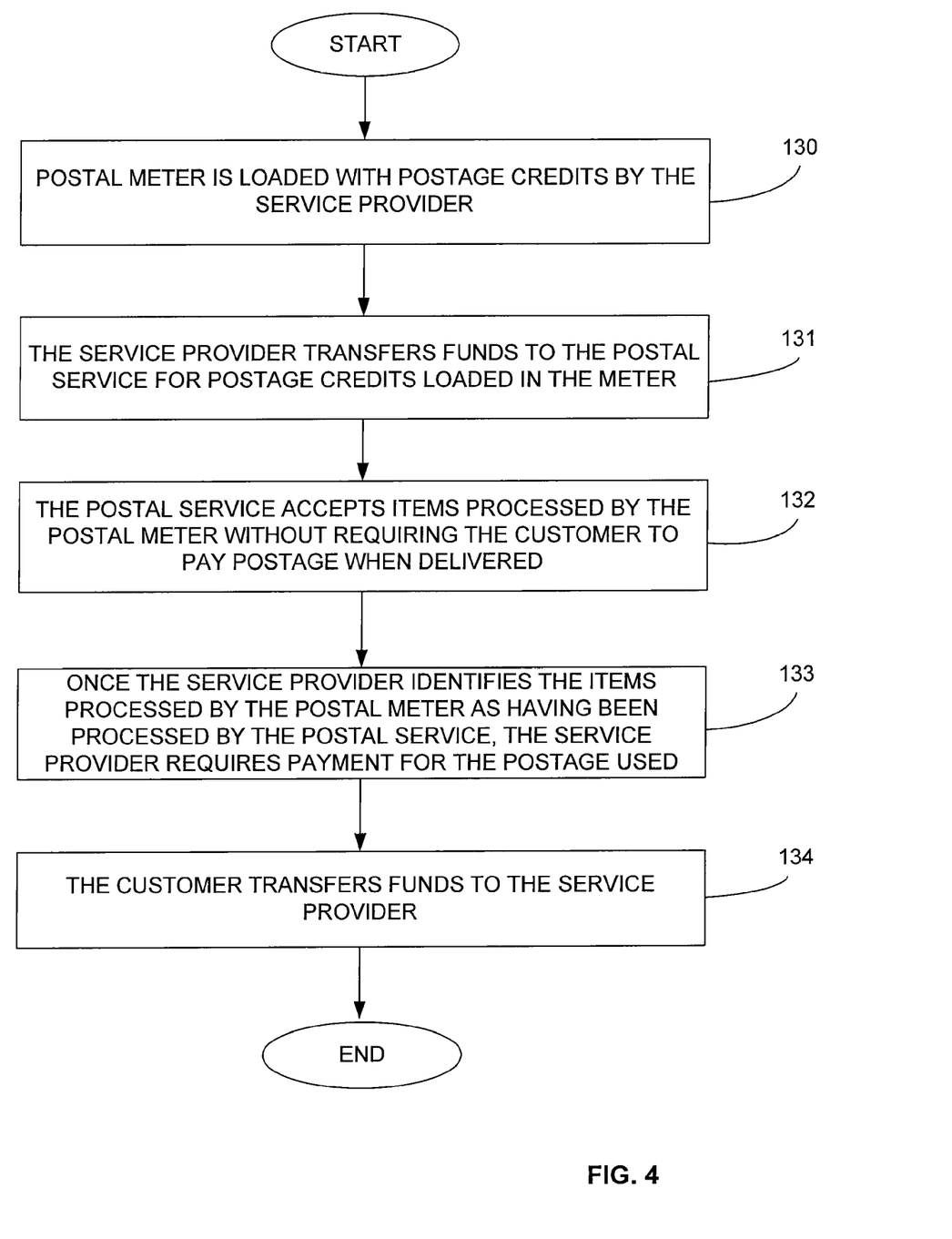
FIG. 4 depicts an example method by which the financial transactions associated with postal services may be performed, in accordance with an aspect of the invention.

FIG. 4 depicts a method of conducting the financial transactions associated with an individual mailing, in accordance with an aspect of the present invention. The method depicted in FIG. 4 may be implemented using portions of the system shown in FIG. 1. For example, a customer's PSD may originally be loaded with postage credits by the service provider 130. The USPS may receive payment for the credited postage according to the amount of postage credited to the machine 131. However, at the time the postage is credited, the customer may not be required to transfer actual funds to either the service provider or the USPS. When the customer uses the PSD to print indicia on a mailing, funds may not be transferred. Again when the mailing is delivered to the USPS funds may not be transferred. Rather the USPS may process the mailing as having been properly funded with the correct postage 132. Once the mailing has been processed by the USPS, the records of the mailing may be found in the Mail Stream. The service provider may then determine the postage value of the mailing actually appearing in the Mail Stream. Once the postage value of the mailing has been determined, the service provider may require payment from the customer 133. In this way, the service provider may effectively extend credit to the customer, allowing the customer to defer payment for postage until that postage is actually used.

In an example embodiment, the PSD may also be refilled by the service provider at the request of the customer, but before payment is made by the customer. Since the PSD may operate in many ways as a typical PSD, of the kind commonly in use by customers of metered mailing services, the PSD may need to be supplied with postage credits before it may be used by a customer to print indicia on items in preparation for mailing. Typically, customers of Metered Mail services are able to fill or refill a PSD with actual postage by contacting a service provider and paying for postage prior to processing any mail.

In an example embodiment, however, a customer may request that a PSD be supplied with postage credits before being required to submit payment to either the service provider or the USPS. For example, a customer may recognize that it needs a certain amount of postage for an upcoming mailing. It may then contact the service provider and request that the PSD be loaded with a sufficient amount of postage credits. The service provider may then, through a secure communications channel, program the PSD with the postage credits requested. However, the service provider may not require payment for the postage credits until such time as payment becomes due, for instance as explained in the example embodiments described above.

In another example embodiment, the PSD may be refilled automatically. For example, the service provider may initially load the PSD with a predetermined quantity of postage credits. The customer may then begin using the PSD in a regular fashion. As the service provider monitors the Mail Stream, in order to determine the quantity of postage actually used to send mail, the service provider may also track the amount of postage used. For instance, at the end of each monitoring period the service provider may examine both the ascending register, as suggested above, and may also examine the descending register. Since, the descending register can reflect the total amount of postage credits remaining in the PSD, the service provider may be immediately able to determine the amount of postage credits remaining in the PSD.

Once the service provider determines the remaining postage credits in the PSD, it may initiate an automatic postage credit transfer if the remaining postage credit value drops below a threshold. The threshold may be set at any amount of postage credit and need not be uniform across all customers. Rather the threshold may be based on the attributes of each customer, for instance, the volume of mail the customer typically generates, or a threshold specifically negotiated, etc.

Security

Embodiments of the present invention provide security to prevent a PSD that exhausts all postage credits from metering mail. For example, the PSD of the present invention can be designed to shut off or not print postage/indicia when all postage credits have been used (or if the amount of postage credit is insufficient for a particular mail piece). The PSD can be designed to be tamper-resistant to prevent a customer from enabling the PSD to print postage indicia in these situations.

Embodiments of the present invention can also provide security by preventing a PSD that does not use postage credits from printing postage indicia when the customer is no longer authorized to use the PSD for metering (e.g., when the service provider tracks the ascending register value of the PSD on metered mail to determine the amount of actual postage used by the customer). Under this scenario, security can be provided by requiring the PSD to register and seek approval to conduct postage printing operations before doing so. For example, the postal meter 21 of FIG. 1 may be required to request permission from the meter management system 12 prior to metering each piece of mail or a batch of mail.

Permission may also be required or validation of the meter 21 may be required on a periodic basis. Routine validation of the meter 21 enables a service provider to shut down the meter 21 if the service provider determines the customer should no longer be allowed to meter mail with the meter 21 (for example by remotely disabling the meter 21 when the customer becomes delinquent in payments to the service provider).

Conclusion

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method comprising:
   providing a customer with a postage meter device;
   loading the postage meter with postage credits before charging the customer for the value of the postage credits,
   printing indicia on one or more items to be mailed using the postage meter;
   monitoring information provided by a postal service for data associated with each of the one or more items;
   determining from the data a descending register value associated with each of the one or more items;
   identifying a first smallest descending register value appearing in the data during a time;
   identifying a second smallest descending register value, the second smallest descending register value being the smallest descending register value appearing in the data during a previous time period;
   subtracting the first smallest descending register value from the second smallest descending register value;
   adjusting the result if the postage meter was refilled during the time period;
   based upon the result, determining a value of postage associated with the one or more items that is a value of postage actually used by the customer; and
   charging the customer for the determined value of postage.

2. The method of claim 1, further comprising:
   printing indicia on each item processed by the postage meter device;
   wherein the postage meter device is a Postal Security Device.

3. The method of claim 1, wherein:
   the value of postage actually used is determined relative to a fixed period of time.

4. The method of claim 1, wherein:
   the value of postage actually used is determined based on an ascending register value.

5. The method of claim 4, wherein the step of determining the value of postage actually used further comprises:
   examining the data during a period of time;
   identifying a first greatest ascending register value appearing in the data during the time period;
   identifying a second greatest ascending register value, the second greatest ascending register value being the greatest ascending register value appearing in the data during a previous time period;
   subtracting from the greatest ascending register value the second ascending register value.

6. The method of claim 5, further comprising:
   adjusting the value of postage actually used for individual items processed by the Postal Security Device and not appearing in the data.

7. The method of claim 6, wherein the value of postage actually used is adjusted based on a customer notification that an item was processed by the Postal Security Device but was not delivered to the Postal Service.

8. The method of claim 7, wherein adjusting the value comprises:
   identifying an ascending register value of each item appearing in the data during the time period;
   identifying a postage value associated with each item appearing in the data during the time period;
   using the ascending register values and the postage values to identify items processed by the Postal Security Device but not yet appearing in the information; and
   adjusting the value of postage actually used based on the items not yet appearing in the data.

9. The method of claim 1, wherein determining the value of postage further comprises:
   determining from the data an ascending register value associated with each of the one or more items;
   identifying a first greatest ascending register value appearing in the data during a time period; and
   identifying a second greatest ascending register value, the second greatest ascending register value being the greatest ascending register value appearing in the data during a previous time period;
   subtracting from the greatest ascending register value the second greatest ascending register value.

10. The method of claim 9, further comprising:
    determining whether items, with ascending register values between the greatest ascending register value and the greatest ascending register value appearing in the data during the previous time period, were never mailed; and
    deducting a value of postage on unmailed items from the value of postage charged to the customer.

11. A system comprising:
    a postage meter device, provisioned to a user by a service provider, in communication with a meter management system maintained by the service provider;
    a billing system maintained by the service provider, in communication with both the meter management system and a service provider mail stream interface; and
    a mail processing system maintained by a postal service in communication with a postal service mail stream interface, the postal service mail stream interface in communication with the service provider mail stream interface;
    wherein the billing system is configured to:
        monitor information provided by a postal service for data associated with each of the one or more items;
        determine from the data a descending register value associated with each of the one or more items;
        identify a first smallest descending register value appearing in the data during a time period;
        identify a second smallest descending register value, the second smallest descending register value being the smallest descending register value appearing in the data during a previous time period;
        subtract the first smallest descending register value from the second smallest descending register value;
        adjust the result if the postage meter was refilled during the time period;

based upon the result, determine a value of postage associated with the one or more items that is the value of postage actually used by the customer; and charge the customer for the determined value of postage.

12. The system of claim 11 wherein:

the billing system is configured to determine the value of postage by:

determining from the information an ascending register value associated with each of the one or more items;

identifying a greatest ascending register value appearing in the information during a time period; and subtracting from the greatest ascending register value the value of a greatest ascending register value appearing in the information during a previous time period.

13. The system of claim 12 wherein:

the billing system is further configured to deduct from the required payment an amount of postage appearing on items never mailed with ascending register values between the greatest ascending register value and the greatest ascending register value appearing in the information during the previous time period.

14. The system of claim 11, wherein: the value of postage actually used is determined relative to a fixed period of time.

15. The system of claim 11, wherein:

the value of postage actually used is determined based on an ascending register value.

16. The system of claim 15, wherein the step of determining the value of postage actually used further comprises:

examining the data during a period of time;

identifying a first greatest ascending register value appearing in the data during the time period;

identifying a second greatest ascending register value, the second greatest ascending register value being the greatest ascending register value appearing in the data during a previous time period;

subtracting from the greatest ascending register value the second ascending register.

17. The system of claim 16, further comprising:

adjusting the value of postage actually used for individual items processed by the Postal Security Device and not appearing in the data.

18. The system of claim 17, wherein the value of postage actually used is adjusted based on a customer notification that an item was processed by the Postal Security Device but was not delivered to the Postal Service.

19. The system of claim 18, wherein adjusting the value comprises:

identifying an ascending register value of each item appearing in the data during the time period;

identifying a postage value associated with each item appearing in the data during the time period;

using the ascending register values and the postage values to identify items processed by the Postal Security Device but not yet appearing in the information; and adjusting the value of postage actually used based on the items not yet appearing in the data.

* * * * *